(12) United States Patent
Jeong et al.

(10) Patent No.: US 12,253,912 B2
(45) Date of Patent: Mar. 18, 2025

(54) MEMORY INCLUDING ERROR CORRECTION CIRCUIT AND OPERATING METHOD THEREOF

(71) Applicant: SK hynix Inc., Gyeonggi-do (KR)

(72) Inventors: Jin Ho Jeong, Gyeonggi-do (KR); Dae Suk Kim, Gyeonggi-do (KR); Munseon Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 27 days.

(21) Appl. No.: 18/170,530

(22) Filed: Feb. 17, 2023

(65) Prior Publication Data

US 2024/0168845 A1 May 23, 2024

(30) Foreign Application Priority Data

Nov. 22, 2022 (KR) .................. 10-2022-0156976

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/0772* (2013.01)

(58) Field of Classification Search
CPC . G06F 11/1068; G06F 11/076; G06F 11/0772
See application file for complete search history.

(56) References Cited

U.S. PATENT DOCUMENTS

| 4,535,455 A | * | 8/1985 | Peterson | G11C 29/88 714/48 |
| 8,347,154 B2 | | 1/2013 | Bahali et al. | |
| 2012/0246525 A1 | * | 9/2012 | Shibata | G11C 16/3431 714/704 |
| 2015/0100848 A1 | * | 4/2015 | Kalamatianos | G11C 29/52 714/764 |
| 2016/0224417 A1 | * | 8/2016 | Tasher | G06F 11/1068 |
| 2020/0218602 A1 | * | 7/2020 | Chen | G06F 11/1068 |
| 2021/0141691 A1 | * | 5/2021 | Song | G06F 11/1068 |
| 2021/0182135 A1 | * | 6/2021 | Gurumurthi | G06F 11/1064 |
| 2022/0180958 A1 | * | 6/2022 | Kim | G11C 29/42 |

* cited by examiner

*Primary Examiner* — Mark D Featherstone
*Assistant Examiner* — Jeffrey Andrew Yang
(74) *Attorney, Agent, or Firm* — IP & T GROUP LLP

(57) ABSTRACT

Disclosed is an operating method of a memory, and the operating method may include reading, from selected memory cells included in the memory, codewords including data and an error correction code; detecting errors in the codewords; correcting the errors in the codewords; re-writing the error-corrected codewords to the selected memory cells; re-reading the re-written error-corrected codewords from the selected memory cells; and determining whether the errors are permanent errors in response to a determination that an error is present in the re-read error-corrected codewords.

13 Claims, 7 Drawing Sheets

MEMORY INCLUDING ERROR CORRECTION CIRCUIT AND OPERATING METHOD THEREOF

CROSS-REFERENCE TO RELATED APPLICATION(S)

This application claims priority under 35 U.S.C. § 119 to Korean Patent Application No. 10-2022-0156976, filed on Nov. 22, 2022, the disclosure of which is incorporated herein by reference in its entirety.

BACKGROUND

1. Field

Various embodiments of the present disclosure relate to a memory.

2. Description of the Related Art

In the early stage of the semiconductor memory industry, a number of originally good dies with no defective memory cells in a memory chip fabricated through a semiconductor fabrication process were distributed on a wafer. However, as the capacity of a memory device gradually increases, it becomes difficult to fabricate a memory device that does not have any defective memory cells, and nowadays, it may be said that there are substantially no chances that such a memory device can be fabricated. One way to resolve this concern is to repair defective memory cells in a memory device with redundant memory cells.

Another way is to use an error correction (ECC) circuit for correcting errors in a memory system to correct errors occurring in the memory cells and errors occurring when data are transmitted during a read operation and/or a write operation of the memory system.

SUMMARY

Various embodiments of the present disclosure are directed to a technology of checking errors in a memory. Particularly, various embodiments of the present disclosure may provide a technology of checking, when errors are detected, whether the errors are permanent errors or transient errors.

In accordance with an embodiment, an operating method of a memory may include: reading, from selected memory cells included in the memory, codewords including data and an error correction code; detecting errors in the codewords; correcting the errors in the codewords; re-writing the error-corrected codewords to the selected memory cells; re-reading the re-written error-corrected codewords from the selected memory cells; and determining whether the errors are permanent errors in response to a determination that an error is present in the re-read error-corrected codewords.

In accordance with an embodiment, an operating method of a memory may include: generating an internal row address; generating an internal column address; reading, from memory cells selected according to the internal row address and the internal column address, codewords including data and an error correction code; detecting errors in the codewords; increasing an error count for a region corresponding to the internal row address, in response to the detection of the errors; correcting the errors in the codewords; re-writing the error-corrected codewords to the selected memory cells; re-reading the re-written error-corrected codewords from the selected memory cells; and determining whether the errors are permanent errors in response to a determination that an error is present in the re-read error-corrected codewords.

In accordance with an embodiment, a memory may include: a memory core; an error correction circuit configured to detect and correct errors in codewords including an error correction code and data, read from the memory core; an error check address generation circuit configured to generate a row address and a column address to be used for an error check operation; and an error check operation control circuit configured to: control the error check operation for classifying a bad region of the memory core, re-write, in response to the detection of the errors in the codewords read from memory cells selected by the row address and the column address in the memory core, the error-corrected codewords to the selected memory cells, re-read the error-corrected codewords from the selected memory cells, and control the error correction circuit to check whether an error is present in the re-read error-corrected codewords.

In accordance with an embodiment, an operating method of a memory may include: entering an error check operation mode; detecting errors for each row of the memory while updating an error count for each row of the memory and a permanent flag for each row, the permanent flag representing whether a corresponding error is permanent or transient; and determining a bad row based on the error count, the permanent flag, and a maximum error count that is previously registered.

DETAILED DESCRIPTION

Figure 1:
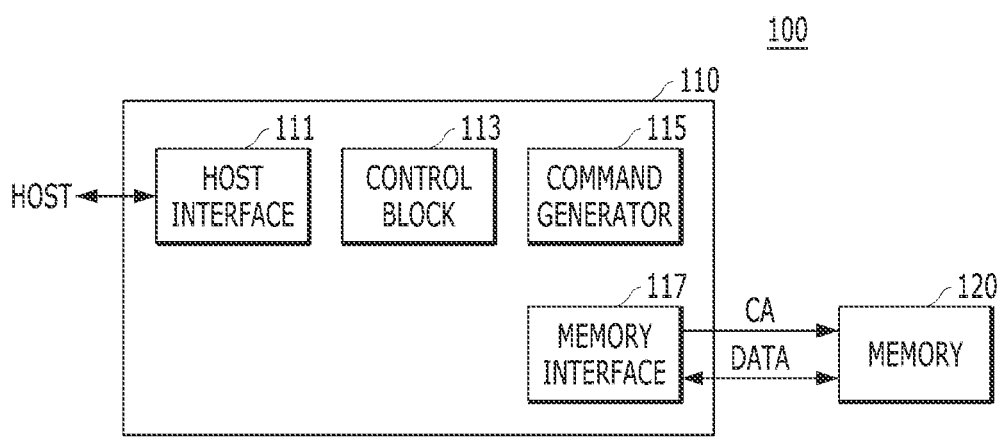
FIG. 1 is a block diagram illustrating a memory system in accordance with an embodiment of the present disclosure.

Various embodiments are described below with reference to the accompanying drawings, in order to describe in detail the present disclosure so that those with ordinary skill in art to which the present disclosure pertains may easily carry out the technical spirit of the present disclosure. Moreover, in describing the present disclosure, publicly-known configurations irrelevant to the subject matters of the present disclosure may be omitted. Throughout this disclosure, like reference numerals refer to like parts throughout the various figures and embodiments of the present disclosure.

It is noted that reference to "an embodiment," "another embodiment" or the like does not necessarily mean only one embodiment, and different references to any such phrase are not necessarily to the same embodiment(s). It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

As used herein, singular forms may include the plural forms as well and vice versa, unless the context clearly indicates otherwise. The articles 'a' and 'an' as used in this application and the appended claims should generally be construed to mean 'one or more' unless specified otherwise or it is clear from context to be directed to a singular form.

FIG. 1 is a block diagram illustrating a memory system 100 in accordance with an embodiment of the present disclosure.

Referring to FIG. 1, the memory system 100 may include a memory controller 110 and a memory 120. The memory controller 110 may control operations of the memory 120 in response to a request from a host (HOST). The host may include a central processing unit (CPU), a graphic processing unit (GPU), an application processor (AP), or the like. The memory controller 110 may include a host interface 111, a control block 113, a command generator 115 and a memory interface 117. The memory controller 110 may be included in the CPU, GPU or AP. In this case, the host may represent a component other than the memory controller 110 in the CPU, GPU or AP. For example, when the memory controller 110 is included in the CPU, the host in the figure may represent components other than the memory controller 110 in the CPU.

The host interface 111 may provide communication between the host and the memory controller 110.

The control block 113 may control overall operations of the memory controller 110, and schedule operations to be performed in the memory 120. That is, the control block 113 may make an order in which requests are received from the host differ from an order of operations to be performed in the memory 120, in order to improve the performance of the memory 120. For example, even though the host requests a read operation of the memory 120 first and then a write operation of the memory 120, the control block 113 may adjust an order of the operations so that the write operation is performed before the read operation.

The command generator 115 may generate commands to be applied to the memory 120 according to the order of operations scheduled by the control block 113.

The memory interface 117 may provide communication between the memory controller 110 and the memory 120. Through the memory interface 117, a command and address CA may be transmitted from the memory controller 110 to the memory 120, and data DATA may be transmitted/ received. The memory interface 117 is also referred to as a physical layer (PHY) interface.

The memory controller 110 may control the memory 120 in an error check operation mode. When the control block 113 determines to operate the memory 120 in the error check operation mode, the command generator 115 may generate a command to control the memory 120 in the error check operation mode, and the memory interface 117 may transmit the command generated by the command generator 115 to the memory 120. Meanwhile, the memory controller 110 may request information about a bad region (e.g., a bad row) collected during an error check operation of the memory 120 from the memory 120, and receive the information about the bad region from the memory 120.

The memory 120 may perform operations commanded by the memory controller 110. The memory 120 is described in detail with reference to FIG. 2.

Figure 2:
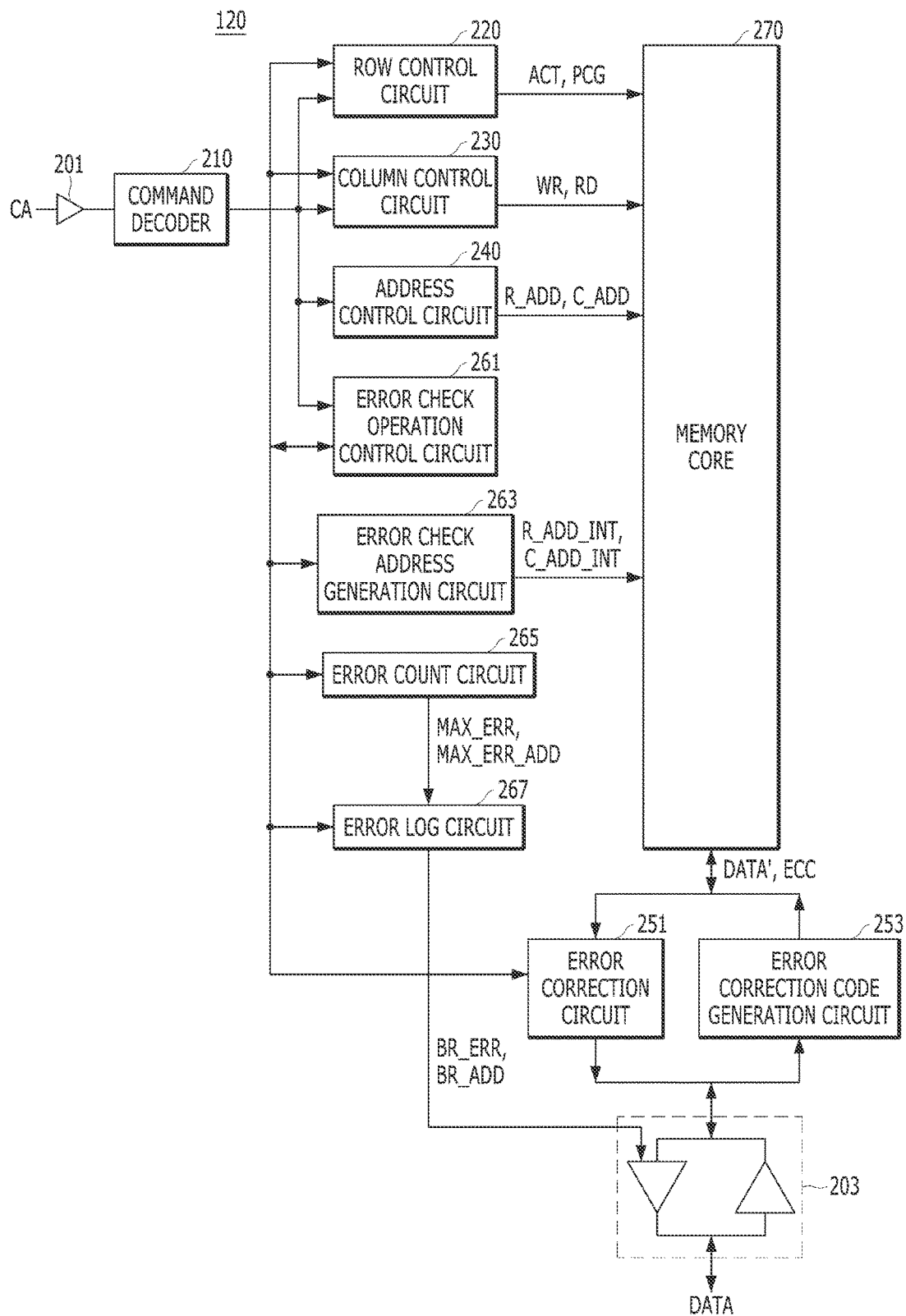
FIG. 2 is a detailed block diagram illustrating an example of a memory illustrated in FIG. 1 in accordance with an embodiment of the present disclosure.

FIG. 2 is a detailed block diagram illustrating an example of the memory 120 illustrated in FIG. 1 in accordance with an embodiment of the present disclosure.

Referring to FIG. 2, the memory 120 may include a command address receiving circuit 201, a data transmitting/ receiving circuit 203, a command decoder 210, a row control circuit 220, a column control circuit 230, an address control circuit 240, an error correction circuit 251, an error correction code generation circuit 253, an error check operation control circuit 261, an error check address generation circuit 263, an error count circuit 265, an error log circuit 267 and a memory core 270.

The command address receiving circuit 201 may receive a command and address CA. Depending on types of the memory 120, the command and address CA may be inputted to the same input terminals or separate input terminals. Herein, it is exemplified that the command and address CA are inputted to the same input terminals. The command and address CA may each be of multi-bit.

The data transmitting/receiving circuit 203 may receive data DATA or transmit data DATA. The data transmitting/ receiving circuit 203 may receive the data DATA to be written to the memory core 270 during a write operation, and transmit the data DATA, which is read from the memory core 270, during a read operation.

The command decoder 210 may decode the command and address CA, and identify types of operations that the memory controller 110 commands the memory 120 to perform.

When row-based operations, such as an active operation and a precharge operation, are commanded as a decoding result of the command decoder 210, the row control circuit 220 may control these operations. An active signal ACT may be a signal commanding the active operation, and a precharge signal PCG may be a signal commanding the precharge operation.

When column-based operations, such as the write operation and a column operation, are commanded as the decoding result of the command decoder 210, the column control circuit 230 may control these operations. A write signal WR may be a signal commanding the write operation, and a read signal RD may be a signal commanding the read operation.

When the error check operation mode is commanded as the decoding result of the command decoder 210, the memory 120 may operate in the error check operation mode. In the error check operation mode, the memory 120 may operate under the control of the error check operation control circuit 261.

The address control circuit 240 may classify the address received from the command decoder 210 into a row address R_ADD and a column address C_ADD, and transmit the row address R_ADD and the column address C_ADD to the memory core 270. The address control circuit 240 may classify the received address as the row address R_ADD when the active operation is commanded as the decoding result of the command decoder 210, and classify the received address as the column address C_ADD when the read and write operations are commanded as the decoding result of the command decoder 210.

The error correction circuit 251 may correct errors of codewords DATA' and ECC read from the memory core 270 during the read operation. The codeword refers to data DATA' and an error correction code ECC for correcting the errors of the data DATA'. The correcting of the errors may refer to detecting the errors of the codewords DATA' and ECC and correcting the errors of the codewords DATA' and ECC when the errors are detected. When the errors of the data DATA' are detected and corrected, the data DATA' inputted to the error correction circuit 251 and the data DATA outputted from the error correction circuit 251 may be different from each other.

The error correction code generation circuit 253 may generate the error correction code ECC by using the data DATA during the write operation. During the write operation, the error correction code ECC is generated using the data DATA, but the errors of the data DATA are not corrected, and therefore, the data DATA inputted to the error correction code generation circuit 253 and the data DATA' outputted from the error correction code generation circuit 253 may be the same.

The error check operation control circuit 261 may control the error check operation of the memory 120. The error check operation is also referred to as an error check and scrub (ECS) operation, which may mean an operation of reading the codewords DATA' and ECC from the memory core 270, checking the errors of the codewords DATA' and ECC by using the error correction circuit 251 and selecting a region with a number of errors. The error check operation control circuit 261 may control the error check operation when the error check operation mode is set. Since rows and columns of the memory core 270 need to be controlled during the error check operation, the error check operation control circuit 261 may control the row control circuit 220 and the column control circuit 230 during the error check operation. In addition, the error check operation control circuit 261 may control the error check address generation circuit 263, the error count circuit 265, the error log circuit 267 and the error correction circuit 251 that are related to the error check operation. When errors are detected during the error check operation, the error check operation control circuit 261 may perform an operation of correcting the errors, writing error-corrected codewords to memory cells in which the errors are detected, reading the memory cells again, and determining whether or not the errors are permanent errors or transient errors according to whether or not the errors are detected again, and detailed descriptions thereof are described with reference to FIGS. 3 and 4.

The error check address generation circuit 263 may generate internal addresses R_ADD_INT and C_ADD_INT to be used for the error check operation. The internal addresses R_ADD_INT and C_ADD_INT may include an internal row address R_ADD_INT and an internal column address C_ADD_INT. The error check address generation circuit 263 may change the internal addresses R_ADD_INT and C_ADD_INT for each error check operation. The error check address generation circuit 263 may increase the internal addresses R_ADD_INT and C_ADD_INT by one step (e.g., '1') whenever the error check operation is performed. When the range of a value of the internal row address R_ADD_INT is 0 to X and the range of a value of the internal column address C_ADD_INT is 0 to Y, the error check address generation circuit 263 may generate the internal addresses R_ADD_INT and C_ADD_INT as (0, 0) during a first error check operation. During a second error check operation, the error check address generation circuit 263 may increase the internal addresses R_ADD_INT and C_ADD_INT by one step, and generate the internal addresses R_ADD_INT and C_ADD_INT as (0, 1). Likewise, during a third error check operation, the error check address generation circuit 263 may increase the internal addresses R_ADD_INT and C_ADD_INT by one step again and generate the internal addresses R_ADD_INT and C_ADD_INT as (0, 2). The internal addresses R_ADD_INT and C_ADD_INT may be increased by one step (e.g., '1') whenever the error check operation is performed, and be generated differently each time, such as (0, 0)→(0, 1)→(0, 2)→ . . . →(0, Y−1)→(0, Y)→(1, 0)→(1, 1)→ . . . →(1, Y−1)→(1, Y)→(2, 0)→(2, 1)→ . . . →(X, Y−1)→(X, Y). Since the error check address generation circuit 263 changes the internal addresses R_ADD_INT and C_ADD_INT whenever the error check operation is performed, the error check operation may be performed on all memory cells of the memory core 270 when the error check operation is repeatedly performed.

The error count circuit 265 may record the number of errors detected during the error check operation and whether or not permanent errors are detected. The error count circuit 265 may internally record an error value (i.e., an error count) ERR and a permanent flag PERM, and externally output a max error value MAX_ERR and a max error address MAX_ERR_ADD. The error value ERR may represent the number of errors detected in a row on which the error check operation is currently being performed, and the permanent flag PERM may represent whether the permanent errors are present in the row on which the error check operation is currently being performed. The max error value (i.e., a maximum error count that is previously registered) MAX_ERR may represent the number of errors detected in a row where errors are detected the most among rows on which the error check operation has been performed, and the max error address MAX_ERR_ADD may represent an address of the row where errors are detected the most.

The error log circuit 267 may classify a candidate of the bad region by using information MAX_ERR and MAX_ERR_ADD received from the error count circuit 265, and store (i.e., register, log, or record) a corresponding information therein. For example, when the max error value MAX_ERR is equal to or greater than a threshold value, the error log circuit 267 may classify a region corresponding to the max error address MAX_ERR_ADD as the bad region, and store the information of the bad region therein. When there is a request from the memory controller 110, information BR_ERR and BR_ADD of the bad region classified by the error log circuit 267 may be transmitted to the memory controller 110 through the data transmitting/receiving circuit 203. Among the information BR_ERR and BR_ADD of the bad region, a bad region error value BR_ERR may represent the number of errors in the bad region, and a bad region address BR_ADD may represent an address corresponding to the bad region.

The memory core 270 may perform operations indicated by the internal command signals ACT, PCG, WR and RD. The memory core 270 may include components for active, precharge, read and write operations, such as a cell array including memory cells arranged in a plurality of rows and a plurality of columns, a row decoder for activating/deactivating the rows of the cell array, a column decoder for inputting/outputting data from the cell array and an input/output circuit. When the active signal ACT is activated, a row selected by the row address R_ADD among the rows of the memory core 270 may be activated. When the precharge signal PCG is activated, the activated row may be deactivated. When the write signal WR is activated, the data DATA' and the error correction code ECC may be written to memory cells of columns selected by the column address C_ADD among the columns of the memory core 270, and when the read signal RD is activated, the data DATA' and the error correction code ECC may be read from the memory cells of the columns selected by the column address C_ADD among the columns of the memory core 270. Moreover, during the error check operation, the internal addresses R_ADD_INT and C_ADD_INT generated by the error check address generation circuit 263 may be used instead of the addresses R_ADD and C_ADD of the address control circuit 240.

During the active operation of the memory 120, the row selected by the row address R_ADD in the memory core 270 may be activated. That is, data of memory cells of the selected row may be sensed. The read and write operations of the memory 120 may be performed in an active state. The precharge operation may refer to an operation of terminating the active operation.

During the read operation of the memory 120, the codewords including the data DATA' and the error correction code ECC may be read from the memory cells of the columns selected by the column address C_ADD in the selected row of the memory core 270. The error correction circuit 251 may correct the errors of the codewords DATA' and ECC, and the error-corrected data DATA may be transmitted to the memory controller 110 through the data transmitting/receiving circuit 203.

During the write operation of the memory 120, the data transmitting/receiving circuit 203 may receive the data DATA transmitted from the memory controller 110. The error correction code generation circuit 253 may generate the error correction code ECC by using the data DATA, and the codewords including the data DATA' and the error correction code ECC may be written to the memory cells of the columns selected by the column address C_ADD in the selected row of the memory core 270.

Figure 3:
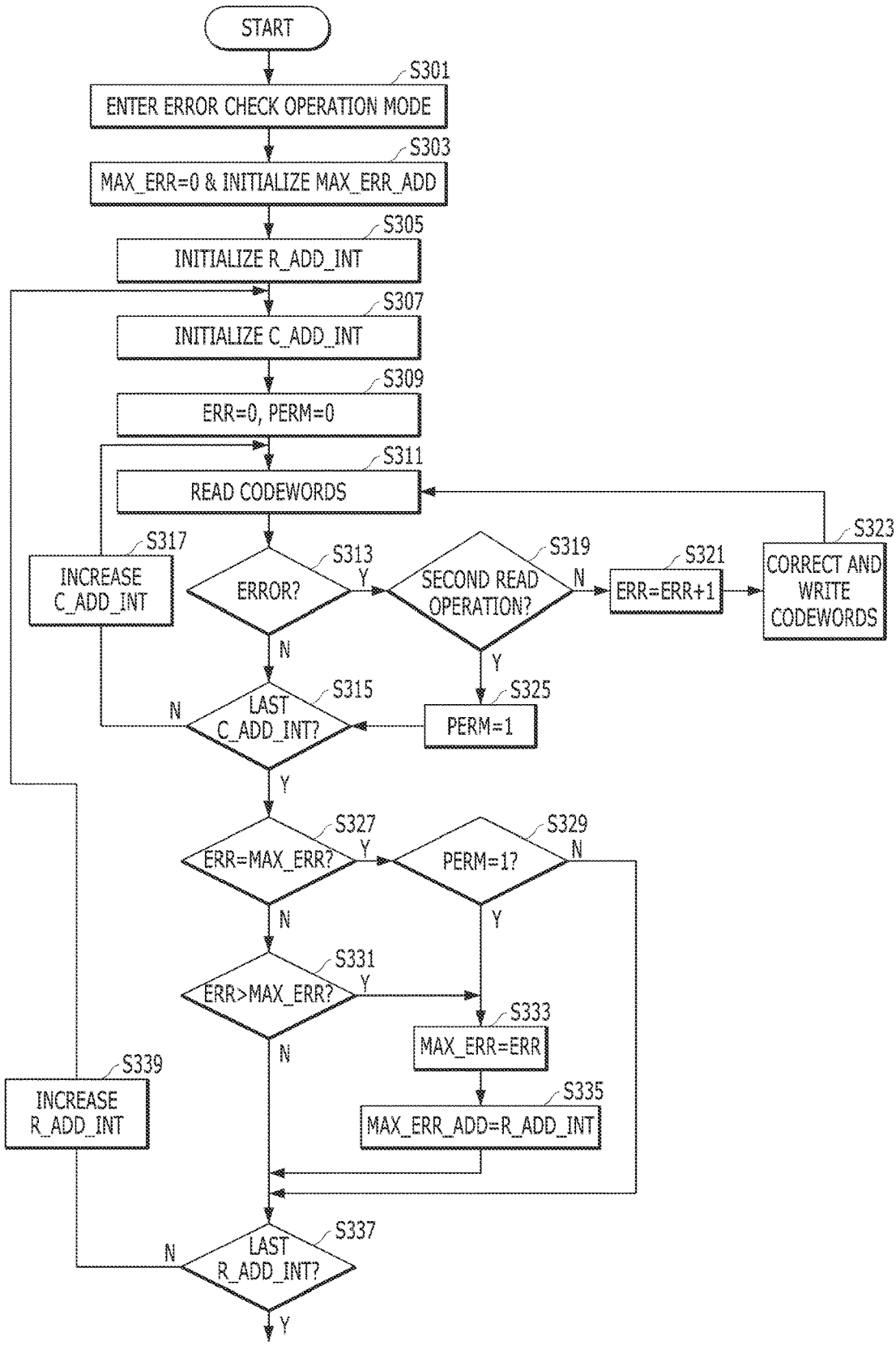
FIGS. 3 and 4 are flowcharts for describing an error check operation of the memory illustrated in FIG. 2 in accordance with an embodiment of the present disclosure.
Figure 4:
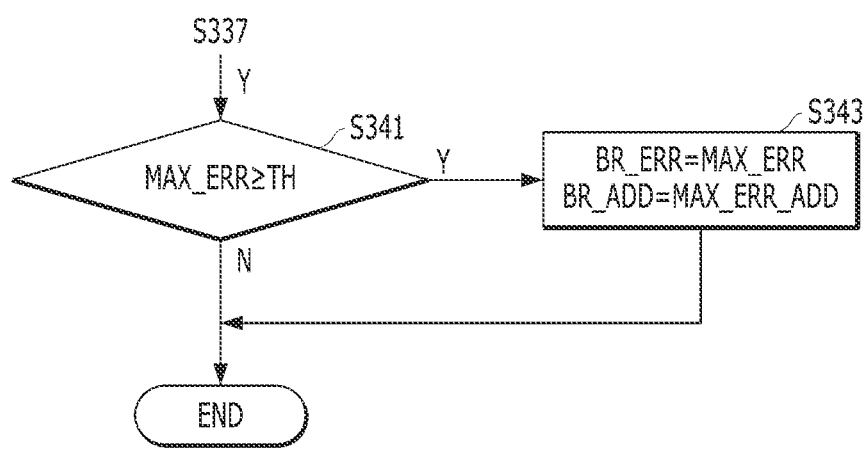

FIGS. 3 and 4 are flowcharts for describing an error check operation of the memory 120 illustrated in FIG. 2 in accordance with an embodiment of the present disclosure. Specifically, FIG. 4 shows a process of logging, by the error log circuit 267, a result of the error check operation.

Referring to FIG. 3, first, the memory 120 may enter the error check operation mode in operation S301. When the memory controller 110 commands the memory 120 to enter the error check operation mode by using the command and address CA, the memory 120 may enter the error check operation mode. When entering the error check operation mode, the memory 120 may operate under the control of the error check operation control circuit 261.

The error count circuit 265 may initialize the max error value MAX_ERR to 0, and initialize the max error address MAX_ERR_ADD, in operation S303. In addition, the error check address generation circuit 263 may initialize the internal row address R_ADD_INT under the control of the error check operation control circuit 261, in operation S305.

Under the control of the error check operation control circuit 261, the error check address generation circuit 263 may initialize the internal column address C_ADD_INT in operation S307, and the error count circuit 265 may initialize the error value ERR to 0, and initialize the permanent flag PERM to 0, in operation S309.

The codewords including the data DATA' and the error correction code ECC may be read from memory cells selected by the internal addresses R_ADD_INT and C_ADD_INT in the memory core 270, in operation S311.

The error correction circuit 251 may sense the errors of the codewords DATA' and ECC in operation S313, and when no errors are detected (that is, "N" in operation S313), an operation S315 may be performed.

When the value of the internal column address C_ADD_INT is not the last value (that is, "N" in operation S315), that is, when the error check operation on all columns is not performed, the error check address generation circuit 263 may change the internal column address C_ADD_INT in operation S317, and the codewords DATA' and ECC may be read from new memory cells in operation S311.

When the errors of the codewords DATA' and ECC are detected by the error correction circuit 251 (that is, "Y" in operation S313), and the read operation is not the second read operation on the same memory cells (that is, "N" in operation S319), that is, errors are detected for the first time in corresponding memory cells, the error count circuit 265 may increase the error value ERR by 1 in operation S321, and the codewords DATA' and ECC error-corrected by the error correction circuit 251 may be written again (i.e., re-written or written back) to the same memory cells in operation S323. Then, the re-written codewords DATA' and ECC may be read again (i.e., re-read) in operation S311, and when errors are detected again (that is, "Y" in operation S313 and "Y" in operation S319), the error count circuit 265 may change the value of the permanent flag PERM to 1 in operation S325. That is, when errors are detected first in the codewords DATA' and ECC read from the memory cells (that is, "Y" in operation S313 and "N" in operation S319), the error value ERR may be increased by 1 in operation S321, and the error-corrected codewords DATA' and ECC may be written again to the same memory cells (from which the codewords are read) in operation S323. When errors are detected again in the re-read codewords DATA' and ECC (that is, "Y" in operation S313 and "Y" in operation S319), the value of the permanent flag PERM may be changed to 1. When errors are detected again in the re-read codewords, it is determined that there are permanent errors in the corresponding memory cells, and when no errors are detected in the re-read codewords, it is determined that the errors in the corresponding memory cells are transient.

When the error check operation is performed on all columns of the current row (that is, "Y" in operation S315), the error value ERR may be equal to the max error value MAX_ERR (that is, "Y" in operation S327), but when the value of the permanent flag PERM is 1 (that is, "Y" in operation S329), the error count circuit 265 may update the max error value MAX_ERR to the error value ERR in operation S333, and update the max error address MAX_ERR_ADD to the current internal row address R_ADD_INT in operation S335. That is, when the value of the permanent flag PERM is 1 even though the current error value ERR is equal to the max error value MAX_ERR, the current internal row address R_ADD_INT corresponding to the current error value ERR may be preferentially updated to the max error address MAX_ERR_ADD.

In addition, when the error value ERR is greater than the max error value MAX_ERR (that is, "N" in operation S327 and "Y" in operation S331), the error count circuit 265 may update the max error value MAX_ERR to the error value ERR in operation S333, and update the max error address MAX_ERR_ADD to the current internal row address R_ADD_INT in operation S335.

On the other hand, when the error value ERR is less than the max error value MAX_ERR (that is, "N" in operation S327 and "N" in operation S331), the max error value MAX_ERR and the max error address MAX_ERR_ADD may not be updated.

When the value of the internal row address R_ADD_INT is not the last value (that is, "N" in operation S337), the error check address generation circuit 263 may change the internal row address R_ADD_INT in operation S339, and the operations S307 to S339 may be repeatedly performed.

Referring to FIG. 4, when the value of the internal row address R_ADD_INT is the last value (that is, "Y" in operation S337), that is, when the error check operation is performed on all memory cells of the memory core 270, the error log circuit 267 may determine whether the max error value MAX_ERR is equal to or greater than a threshold value TH, in operation S341.

When the max error value MAX_ERR is equal to or greater than the threshold value TH (that is, "Y" in operation S341), the error log circuit 267 may determine a region corresponding to the max error address MAX_ERR_ADD as the bad region, update the bad region error value BR_ERR to the max error value MAX_ERR, and update the bad region address BR_ADD to the max error address MAX_ERR_ADD, in operation S343. Herein, the bad region error value BR_ERR and the bad region address BR_ADD may be bad region information logged by the error log circuit 267. The bad region error value BR_ERR may represent the number of errors in a corresponding bad region, and the bad region address BR_ADD may be an address corresponding to the bad region.

When the max error value MAX_ERR is less than the threshold value TH (that is, "N" in operation S341), the error log circuit 267 may determine that it is not necessary to classify the region corresponding to the max error address MAX_ERR_ADD as the bad region, and the operation may be ended.

Referring to FIGS. 3 and 4, when errors of codewords are detected during an error check operation, it may be seen that the errors of the codewords are corrected, the error-corrected codewords are written again to memory cells in which the errors are detected, the codewords are read again from the memory cells in which the errors are detected, it is determined whether errors are present in the memory cells, and it is determined whether the errors of the memory cells in which the errors are detected are permanent or transient.

In addition, a region in which permanent errors are detected may be preferentially classified as the max error address MAX_ERR_ADD, and consequently, also be preferentially classified as a bad region.

Figure 5:
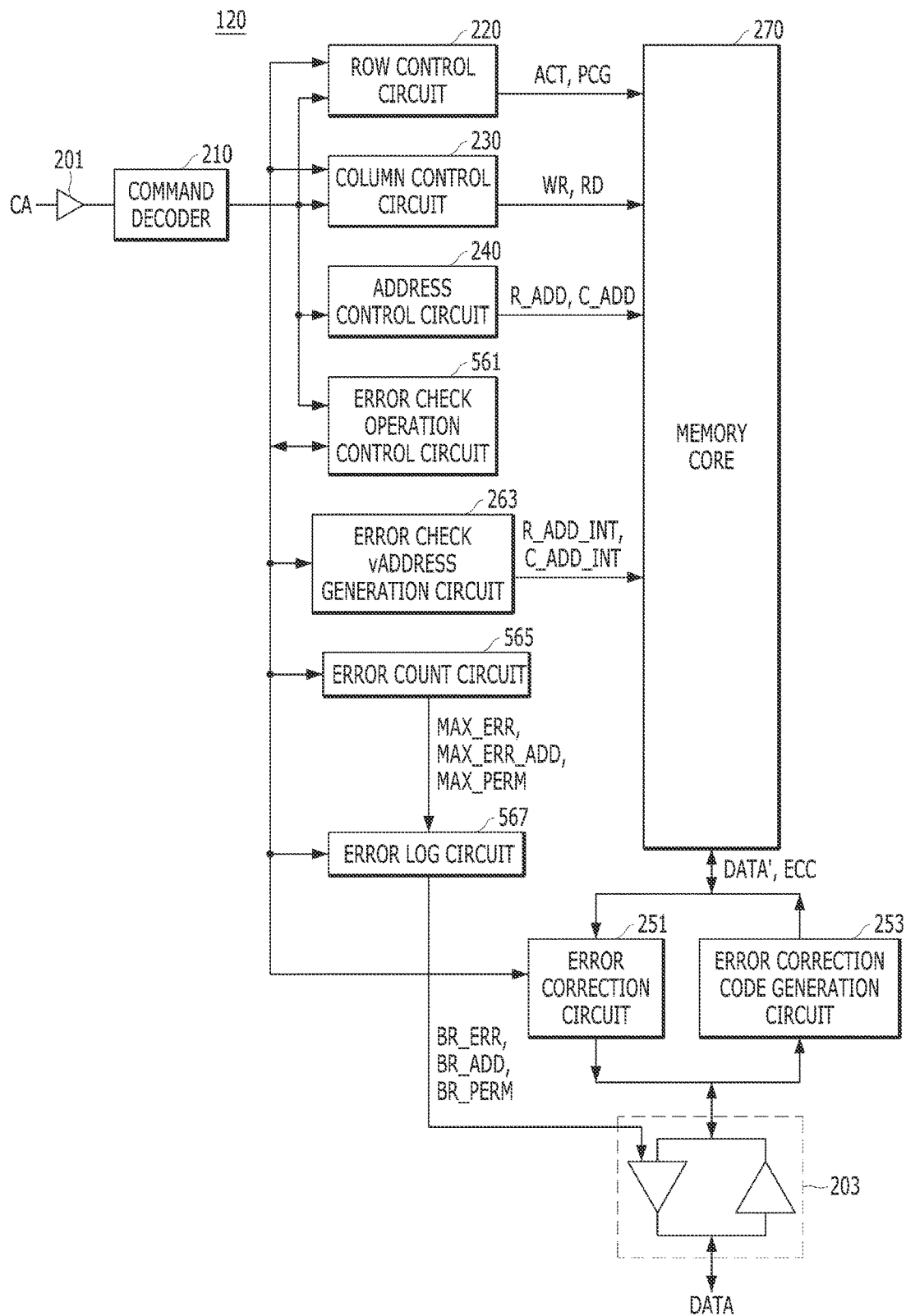
FIG. 5 is a block diagram illustrating another example of the memory illustrated in FIG. 1 in accordance with an embodiment of the present disclosure.

FIG. 5 is a block diagram illustrating another example of the memory 120 illustrated in FIG. 1 in accordance with an embodiment of the present disclosure. An error log circuit 567 included in the memory 120 according to the embodiment of FIG. 5 may log information about a bad region in more detail than the error log circuit 267 included in the memory 120 according to the embodiment of FIG. 2.

Referring to FIG. 5, the memory 120 may include a command address receiving circuit 201, a data transmitting/receiving circuit 203, a command decoder 210, a row control circuit 220, a column control circuit 230, an address control circuit 240, an error correction circuit 251, an error correction code generation circuit 253, an error check operation control circuit 561, an error check address generation circuit 263, an error count circuit 565, the error log circuit 567 and a memory core 270.

The error check operation control circuit 561 may control the error check operation of the memory 120. Since the information about the bad region logged by the error log circuit 567 is different from that illustrated in FIG. 2, the error check operation control of the error check operation control circuit 561 may be different from the error check operation control of the error check operation control circuit 261. Detailed descriptions thereof are described with reference to FIGS. 6 and 7.

The error count circuit 565 may record the number of detection of errors detected during the error check operation and whether or not the permanent errors are detected. The error count circuit 565 may internally record an error value ERR and a permanent flag PERM, and externally output a max error value MAX_ERR, a max error address MAX_ERR_ADD and a max permanent flag MAX_PERM. The error value ERR may represent the number of errors detected in a row on which the error check operation is currently being performed, and the permanent flag PERM may represent whether the permanent errors are present in the row on which the error check operation is currently being performed. The max error value MAX_ERR may represent the number of errors detected in a row where errors are detected the most among rows on which the error check operation has been performed, and the max error address MAX_ERR_ADD may represent an address of the row where errors are detected the most. The max permanent flag MAX_PERM may represent whether the permanent errors are present in the row where errors are detected the most.

The error log circuit 567 may classify and store the bad region by using information MAX_ERR, MAX_ERR_ADD and MAX_PERM received from the error count circuit 565. When there is a request from the memory controller 110, information BR_ERR, BR_ADD and BR_PERM of the bad region classified by the error log circuit 567 may be transmitted to the memory controller 110 through the data transmitting/receiving circuit 203. Among the information BR_ERR, BR_ADD and BR_PERM of the bad region, a bad region error value BR_ERR may represent the number of errors in the bad region, and a bad region address BR_ADD may represent an address corresponding to the bad region. A bad region permanent information BR_PERM may represent whether permanent errors are present in the bad region.

Figure 6:
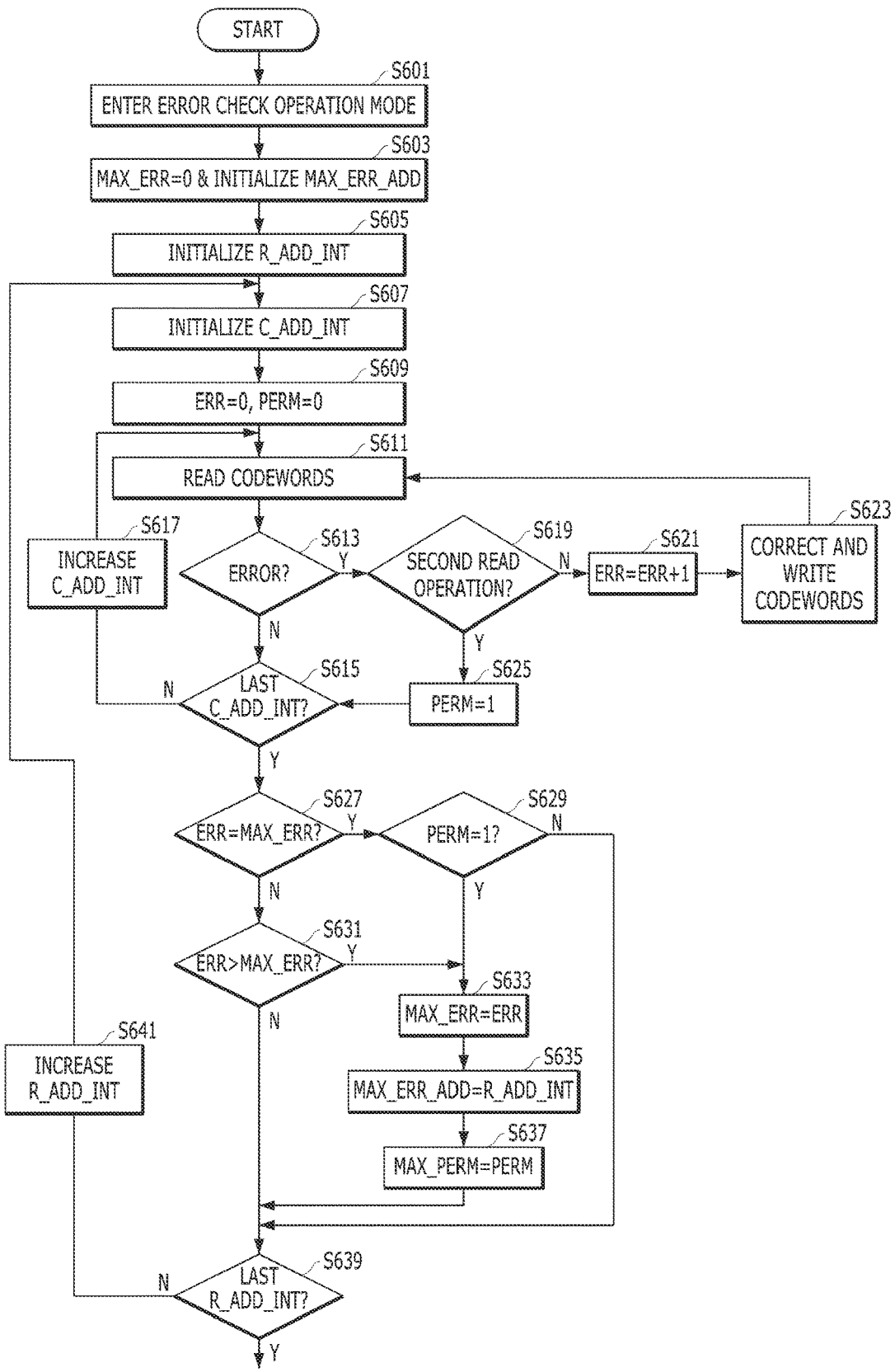
FIGS. 6 and 7 are flowcharts for describing an error check operation of the memory illustrated in FIG. 5 in accordance with an embodiment of the present disclosure.
Figure 7:
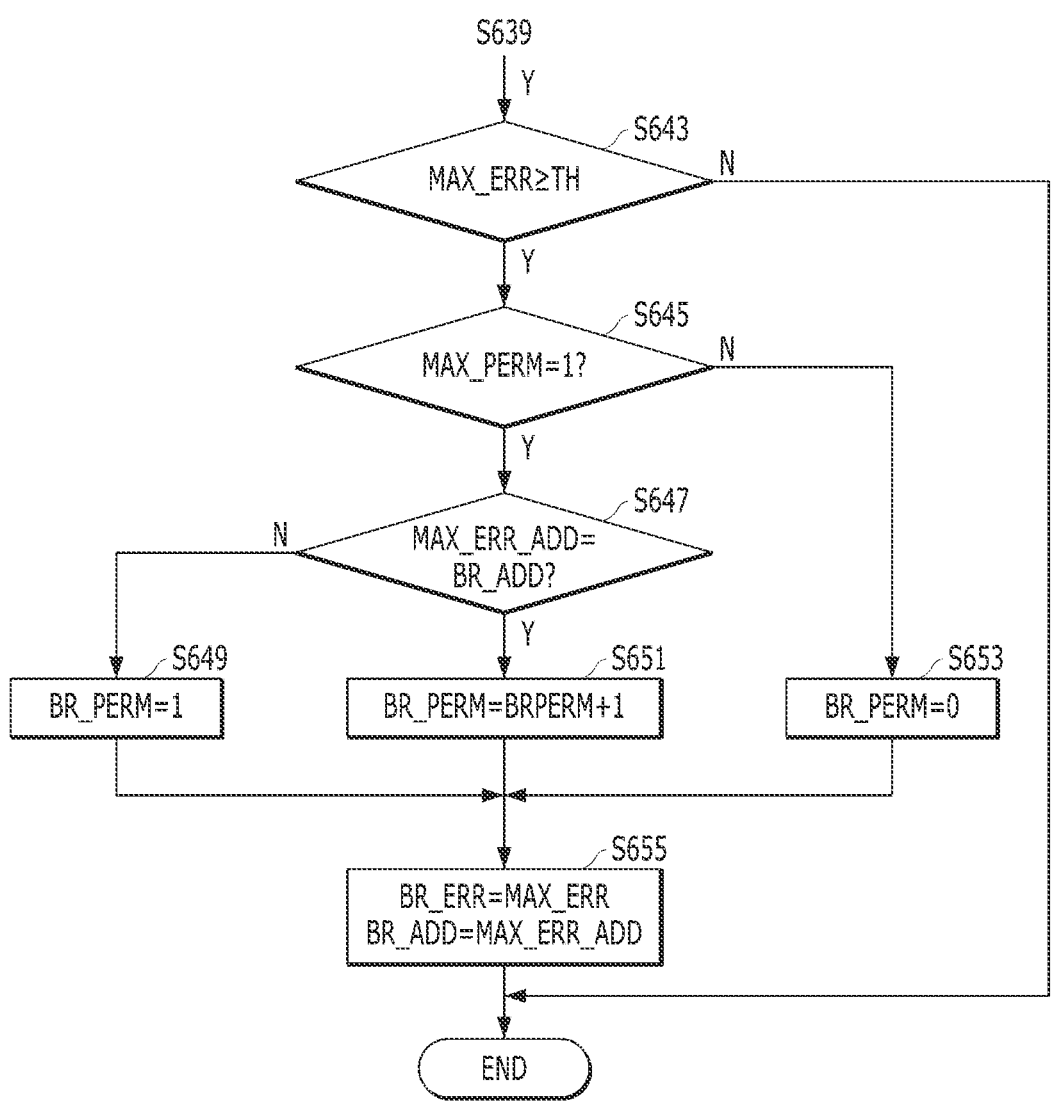

FIGS. 6 and 7 are flowcharts for describing an error check operation of the memory 120 illustrated in FIG. 5 in accordance with an embodiment of the present disclosure. Specifically, FIG. 7 shows a process of logging, by the error log circuit 567, a result of the error check operation.

Referring to FIG. 6, first, the memory 120 may enter the error check operation mode in operation S601. When the memory controller 110 commands the memory 120 to enter the error check operation mode by using the command and address CA, the memory 120 may enter the error check operation mode. When entering the error check operation mode, the memory 120 may operate under the control of the error check operation control circuit 561.

The error count circuit 565 may initialize the max error value MAX_ERR to 0, initialize the max error address MAX_ERR_ADD and initialize the max permanent flag MAX_PERM to 0, in operation S603. In addition, the error check address generation circuit 263 may initialize the internal row address R_ADD_INT under the control of the error check operation control circuit 561, in operation S605.

Under the control of the error check operation control circuit 561, the error check address generation circuit 263 may initialize the internal column address C_ADD_INT in operation S607, and the error count circuit 565 may initialize the error value ERR to 0, and initialize the permanent flag PERM to 0, in operation S609.

The codewords including the data DATA' and the error correction code ECC may be read from memory cells selected by the internal addresses R_ADD_INT and C_ADD_INT in the memory core 270, in operation S611.

The error correction circuit 251 may sense the errors of the codewords DATA' and ECC in operation S613, and when no errors are detected (that is, "N" in operation S613), an operation of operation S615 may be performed.

When the value of the internal column address C_ADD_INT is not the last value (that is, "N" in operation S615), that is, when the error check operation is not performed on all columns, the error check address generation circuit 263 may change the internal column address C_ADD_INT in operation S617, and the codewords DATA' and ECC may be read from new memory cells in operation S611.

When the errors of the codewords DATA' and ECC are detected by the error correction circuit 251 (that is, "Y" in operation S613), and the read operation is not the second read operation on the same memory cells (that is, "N" in operation S619), that is, errors are detected for the first time in corresponding memory cells, the error count circuit 565 may increase the error value ERR by 1 in operation S621, and the codewords DATA' and ECC error-corrected by the error correction circuit 251 may be written again to the same memory cells in operation S623. Then, the re-written codewords DATA' and ECC may be read again in operation S611, and when errors are detected again (that is, "Y" in operation S613 and "Y" in operation S619), the error count circuit 565 may change the value of the permanent flag PERM to 1 in operation S625. That is, when errors are detected first in the codewords DATA' and ECC read from the memory cells (that is, "Y" in operation S613 and "N" in operation S619), the error value ERR may be increased by 1 in operation S621, and the error-corrected codewords DATA' and ECC may be written again to the same memory cells (from which the codewords are read) in operation S623. When errors are detected again in the re-read codewords DATA' and ECC (that is, "Y" in operation S613 and "Y" in operation S619), the value of the permanent flag PERM may be changed to 1. When errors are detected again in the re-read codewords, it is determined that there are permanent errors in the corresponding memory cells, and when no errors are detected in the re-read codewords, it is determined that the errors in the corresponding memory cells are transient.

When the error check operation is performed on all columns of the current row (that is, "Y" in operation S615), the error value ERR may be equal to the max error value MAX_ERR (that is, "Y" in operation S627), but when the value of the permanent flag PERM is 1 (that is, "Y" in operation S629), the error count circuit 565 may update the max error value MAX_ERR to the error value ERR in operation S633, update the max error address MAX_ERR_ADD to the current internal row address R_ADD_INT in operation S635, and update the max permanent flag MAX_PERM to the permanent flag PERM in operation S637. That is, when the value of the permanent flag PERM is 1 even though the current error value ERR is equal to the max error value MAX_ERR, values related to the current internal row address R_ADD_INT corresponding to the current error value ERR may be preferentially updated to the max error value MAX_ERR, the max error address MAX_ERR_ADD and the max permanent flag MAX_PERM.

In addition, when the error value ERR is greater than the max error value MAX_ERR (that is, "N" in operation S627 and "Y" in operation S631), the error count circuit 565 may update the max error value MAX_ERR to the error value ERR in operation S633, update the max error address MAX_ERR_ADD to the current internal row address R_ADD_INT in operation S635, and update the max permanent flag MAX_PERM to the permanent flag PERM in operation S637.

On the other hand, when the error value ERR is less than the max error value MAX_ERR (that is, "N" in operation S627 and "N" in operation S631), the max error value MAX_ERR, the max error address MAX_ERR_ADD and the max permanent flag MAX_PERM may not be updated.

When the value of the internal row address R_ADD_INT is not the last value (that is, "N" in operation S639), the error check address generation circuit 263 may change the internal row address R_ADD_INT in operation S641, and the operations S607 to S641 may be repeatedly performed.

Referring to FIG. 7, when the value of the internal row address R_ADD_INT is the last value (that is, "Y" In operation S639), that is, when the error check operation is performed on all memory cells of the memory core 270, the error log circuit 567 may determine whether the max error value MAX_ERR is equal to or greater than a threshold value TH, in operation S643.

When the max error value MAX_ERR is less than the threshold value TH (that is, "N" in operation S643), the error log circuit 567 may determine that it is not necessary to classify a region corresponding to the max error address MAX_ERR_ADD as the bad region, and the operation may be ended.

When the max error value MAX_ERR is equal to or greater than the threshold value TH (that is, "Y" in operation S643), the error log circuit 567 may determine the region corresponding to the max error address MAX_ERR_ADD as the bad region. When the max permanent flag MAX_PERM is 0 (that is, "NO" in operation S645), the error log circuit 567 may update the bad region permanent information BR_PERM to 0 in operation S653, update the bad region error value BR_ERR to the max error value MAX_ERR, and update the bad region address BR_ADD to the max error address MAX_ERR_ADD in operation S655.

When the max permanent flag MAX_PERM is 1 (that is, "Y" in operation S645) and the max error address MAX_ERR_ADD is different from the bad region address BR_ADD (that is, "N" in operation S647), the error log circuit 567 may update the bad region permanent information BR_PERM to 1 in operation S649, update the bad region error value BR_ERR to the max error value MAX_ERR, and update the bad region address BR_ADD to the max error address MAX_ERR_ADD in operation S655.

When the max permanent flag MAX_PERM is 1 (that is, "Y" in operation S645) and the max error address MAX_ERR_ADD is the same as the bad region address BR_ADD (that is, "Y" in operation S647), that is, a region corresponding to the max error address MAX_ERR_ADD is already classified as the bad region, the error log circuit 567 may increase the bad region permanent information BR_PERM by 1 in operation S651, update the bad region error value BR_ERR to the max error value MAX_ERR, and update the bad region address BR_ADD to the max error address MAX_ERR_ADD in operation S655.

Consequently, in the collected bad region information, the bad region error value BR_ERR may represent the number of detected errors in the bad region, the bad region address BR_ADD may represent an address corresponding to the bad region, and the bad region permanent information BR_PERM may represent whether permanent errors are present in the bad region and how many times it is determined that the permanent errors are present in the bad region.

Referring to FIGS. 6 and 7, when errors of codewords are detected during an error check operation, it may be seen that the errors of the codewords are corrected, the error-corrected codewords are written again to memory cells in which the errors are detected, the codewords are read again from the memory cells in which the errors are detected, it is determined whether errors are present in the memory cells, and it is determined whether the errors of the memory cells in which the errors are detected are permanent or transient.

In addition, a region in which permanent errors are detected may be preferentially classified as the max error address MAX_ERR_ADD, and consequently, also be preferentially classified as a bad region. Information on whether or not the permanent errors are detected in the bad region may be logged in the error log circuit 567.

According to an embodiment of the present disclosure, errors may be checked in a memory. Particularly, when errors are detected, whether the errors are permanent errors or transient errors may be checked.

While the present disclosure has been illustrated and described with respect to specific embodiments, the disclosed embodiments are for illustrative purposes, not for restrictive purposes. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An operating method of a memory, the operating method comprising:
    reading, from selected memory cells included in the memory, codewords including data and an error correction code;
    detecting errors in the codewords;
    correcting the errors in the codewords;
    re-writing the error-corrected codewords to the selected memory cells;
    re-reading the re-written error-corrected codewords from the selected memory cells;
    determining whether the errors are permanent errors in response to a determination that an error is present in the re-read error-corrected codewords;
    classifying a row where a greatest number of errors are detected among rows of the memory as a first candidate of a bad region, while preferentially classifying a row including the permanent errors among rows having a same greatest number of errors as the first candidate of the bad region as a second candidate of the bad region; and
    classifying the second candidate of the bad region as the bad region when the same greatest number of errors of the second candidate of the bad region is greater than or equal to a threshold value.

2. The operating method of claim 1, wherein the determining of whether the errors are permanent errors includes:
    determining that the errors are the permanent errors when an error is present in the re-read error-corrected codewords, and
    determining that the errors are transient errors when an error is not present in the re-read error-corrected codewords.

3. The operating method of claim 1,
    wherein the reading of the codewords, the detecting of the errors, the correcting of the errors, the re-writing of the error-corrected codewords, the re-reading of the re-written error-corrected codewords and the determining of whether the errors are permanent errors are performed during an error check operation of the memory, and
    wherein the bad region is classified in the error check operation.

4. The operating method of claim 1, further comprising storing, when the bad region is classified, a row address of the bad region and whether the permanent errors are included in the bad region.

5. An operating method of a memory, the operating method comprising:
    generating an internal row address;
    generating an internal column address;
    reading, from memory cells selected according to the internal row address and the internal column address, codewords including data and an error correction code;
    detecting errors in the codewords;
    increasing an error count for a region corresponding to the internal row address, in response to the detection of the errors;
    correcting the errors in the codewords;
    re-writing the error-corrected codewords to the selected memory cells;
    re-reading the re-written error-corrected codewords from the selected memory cells; and
    determining whether the errors are permanent errors in response to a determination that an error is present in the re-read error-corrected codewords, and activating a permanent flag representing that the errors are the permanent errors;
    classifying a row with a higher error count as a first candidate of a bad region, while preferentially classifying a row for which the permanent flag is activated among rows having a same greatest number of errors as the first candidate of the bad region as a second candidate of the bad region; and
    classifying the second candidate of the bad region as the bad region when the greatest number of errors of the second candidate of the bad region is equal to or greater than a threshold value.

6. The operating method of claim 5,
    wherein the generating of the internal row address, the generating of the internal column address, the reading of the codewords, the detecting of the errors, the increasing of the error count, the correcting of the errors, the re-writing of the error-corrected codewords, the determining of whether the errors are permanent errors are performed during an error check operation of the memory, and
    wherein the error count and the permanent flag are assigned to each row of the memory during the error check operation.

7. The operating method of claim 5, further comprising registering, when the bad region is classified, a row address of the bad region and whether the permanent errors are included in the bad region.

8. The operating method of claim 7, further comprising registering, when the bad region is classified, whether the permanent errors are detected twice or more in a same region.

9. A memory comprising:
    a memory core;
    an error correction circuit configured to detect and correct errors in codewords including an error correction code and data, read from the memory core;
    an error check address generation circuit configured to generate a row address and a column address to be used for an error check operation; and an error check operation control circuit configured to:
control the error check operation for classifying a bad region of the memory core,
re-write, in response to the detection of the errors in the codewords read from memory cells selected by the row address and the column address in the memory core, the error-corrected codewords to the selected memory cells,
re-read the error-corrected codewords from the selected memory cells, and
determine whether the errors are permanent errors in response to whether an error is present in the re-read error-corrected codewords; and
an error log circuit configured to classify a row where a greatest number of errors are detected among rows of the memory as a first candidate of a bad region, while preferentially classifying a row including the permanent errors among rows having a same greatest number of errors as the first candidate of the bad region as a second candidate of the bad region, and classify the second candidate of the bad region as the bad region when the same greatest number of errors of the second candidate of the bad region is greater than or equal to a threshold value.

10. The memory of claim 9, wherein the error check operation control circuit:
   determines that the errors are the permanent errors when an error is present in the re-read error-corrected codewords, and
   determines that the errors are transient errors when an error is not present in the re-read error-corrected codewords.

11. The memory of claim 9, further comprising:
   an error count circuit configured to record, for each row of the memory core, a number of detected errors and a permanent flag representing whether the errors are the permanent errors; and
   the error log circuit configured to classify and register the bad region by using information recorded in the error count circuit.

12. The memory of claim 9, wherein the error log circuit stores a row address of the bad region and the number of detected errors for the bad region.

13. The memory of claim 12, wherein the error log circuit further stores information representing whether the permanent errors are present in the bad region.

* * * * *